US009179767B2

(12) United States Patent
Glenn, II et al.

(10) Patent No.: US 9,179,767 B2
(45) Date of Patent: Nov. 10, 2015

(54) CONNECTOR PIECE FOR CONNECTING MULTIPLE LEGS

(71) Applicant: Land 1 Brands, LLC, Plymouth, WI (US)

(72) Inventors: Robert J. Glenn, II, Chicago, IL (US); Daniel G. Gray, Sheboygan, WI (US)

(73) Assignee: Land 1 Brands, LLC, Plymouth, WI (US)

(*) Notice: Subject to any disclaimer, the term of this patent is extended or adjusted under 35 U.S.C. 154(b) by 0 days.

(21) Appl. No.: 14/308,329

(22) Filed: Jun. 18, 2014

(65) Prior Publication Data
US 2015/0208798 A1 Jul. 30, 2015

Related U.S. Application Data

(60) Provisional application No. 61/933,399, filed on Jan. 30, 2014.

(51) Int. Cl.
A47B 13/00 (2006.01)
A47B 13/02 (2006.01)
F16B 12/40 (2006.01)

(52) U.S. Cl.
CPC ............ *A47B 13/02* (2013.01); *F16B 12/40* (2013.01); *A47B 2013/026* (2013.01)

(58) Field of Classification Search
CPC ........ A47B 3/12; A47B 13/02; F16B 7/0446; F16B 7/0473; E04B 2001/3247; E04B 1/1903
USPC .............. 108/153.1, 158.13, 147.12, 147.14, 108/147.15, 193, 192; 248/231.31, 220.1, 248/224.51; 403/172, 176
See application file for complete search history.

(56) References Cited

U.S. PATENT DOCUMENTS

| 2,131,049 | A | | 9/1938 | Kiesler | |
| 2,904,360 | A | * | 9/1959 | Gamlen | 403/172 |
| 2,956,705 | A | * | 10/1960 | Clingman | 403/172 |
| 3,347,509 | A | | 10/1967 | Holz et al. | |
| 3,561,801 | A | * | 2/1971 | Chiu | 403/264 |
| 3,747,965 | A | | 7/1973 | Wing | |
| 3,797,948 | A | * | 3/1974 | Weininger | 403/245 |
| 3,932,046 | A | | 1/1976 | Kawazu | |
| 3,977,800 | A | * | 8/1976 | Cassel | 403/172 |
| 4,027,987 | A | | 6/1977 | Berkowitz | |
| 4,036,371 | A | * | 7/1977 | Michel | 403/171 |
| D258,105 | S | | 2/1981 | Baker | |
| 4,413,570 | A | * | 11/1983 | Haigh | 108/158.13 |
| 4,498,452 | A | | 2/1985 | Schlosser et al. | |
| 4,516,376 | A | * | 5/1985 | King | 403/176 |
| 4,570,408 | A | * | 2/1986 | Frascaroli et al. | 403/176 |
| 4,630,550 | A | * | 12/1986 | Weitzman | 108/158.11 |
| 4,673,308 | A | * | 6/1987 | Reilly | 403/172 |
| 4,988,230 | A | * | 1/1991 | Banthia et al. | 403/170 |
| 5,230,197 | A | * | 7/1993 | Hart | 52/653.2 |
| 5,516,225 | A | * | 5/1996 | Kvols | 403/176 |
| 5,590,974 | A | * | 1/1997 | Yang | 403/171 |
| 5,598,790 | A | | 2/1997 | Fich | |

(Continued)

Primary Examiner — Jose V Chen
(74) Attorney, Agent, or Firm — Nixon Peabody LLP

(57) ABSTRACT

A leg connector for securing legs that support a load includes a core and at least three coupling portions extending away from the core and arranged equidistantly around the core. Each coupling portion includes fins that bend inwardly when the coupling portion is inserted into an exposed end of a corresponding one of the legs. Each of the coupling portions includes a hole that receives a fastener to secure the respective coupling portion with a corresponding one of the legs.

16 Claims, 9 Drawing Sheets

(56) References Cited

U.S. PATENT DOCUMENTS

| | | | |
|---|---|---|---|
| 7,481,235 B2 * | 1/2009 | Prusmack | 403/172 |
| 7,694,635 B2 * | 4/2010 | Bernheimer et al. | 108/153.1 |
| 7,883,288 B2 * | 2/2011 | Jorna | 403/171 |
| 8,671,644 B2 * | 3/2014 | Huang | 403/172 |

* cited by examiner

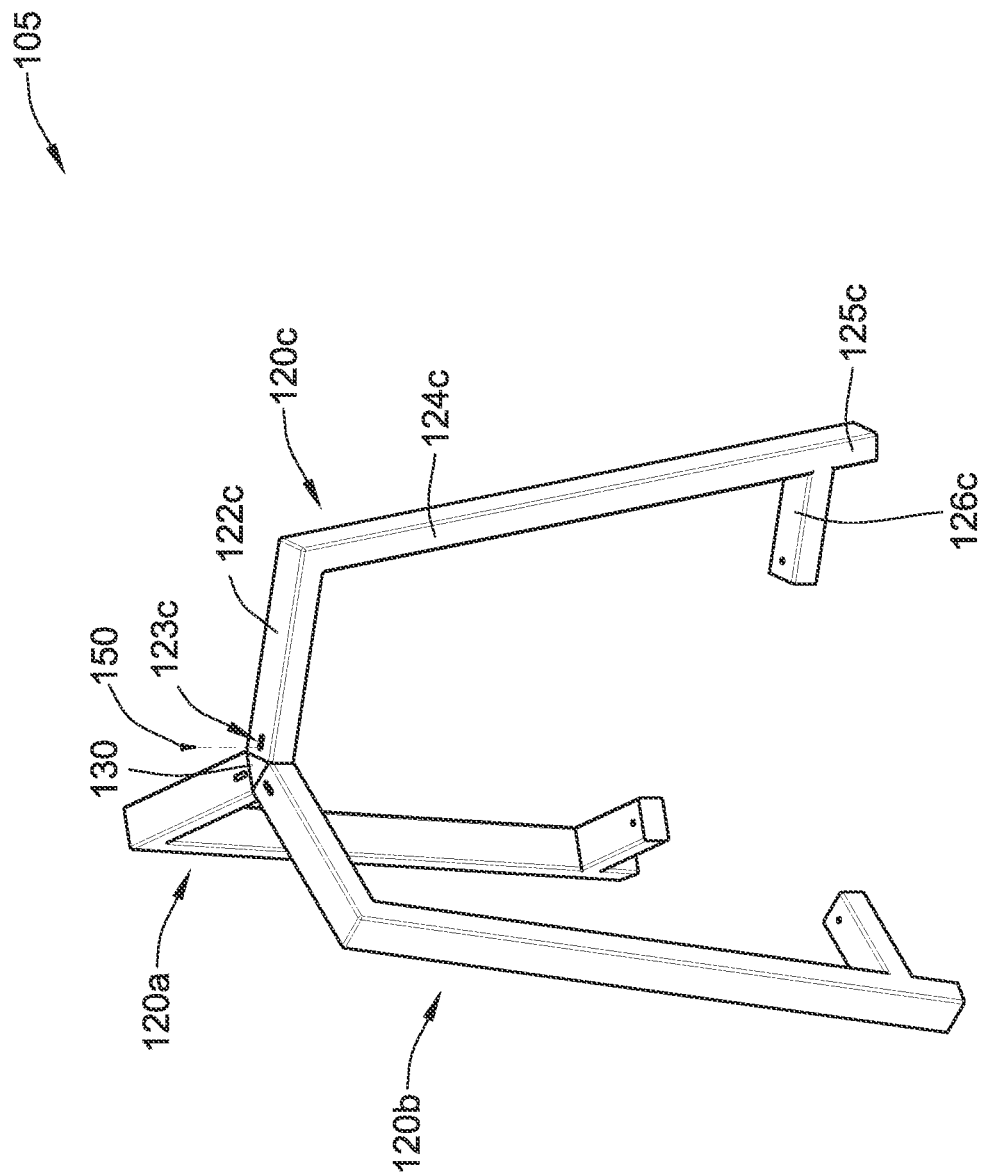

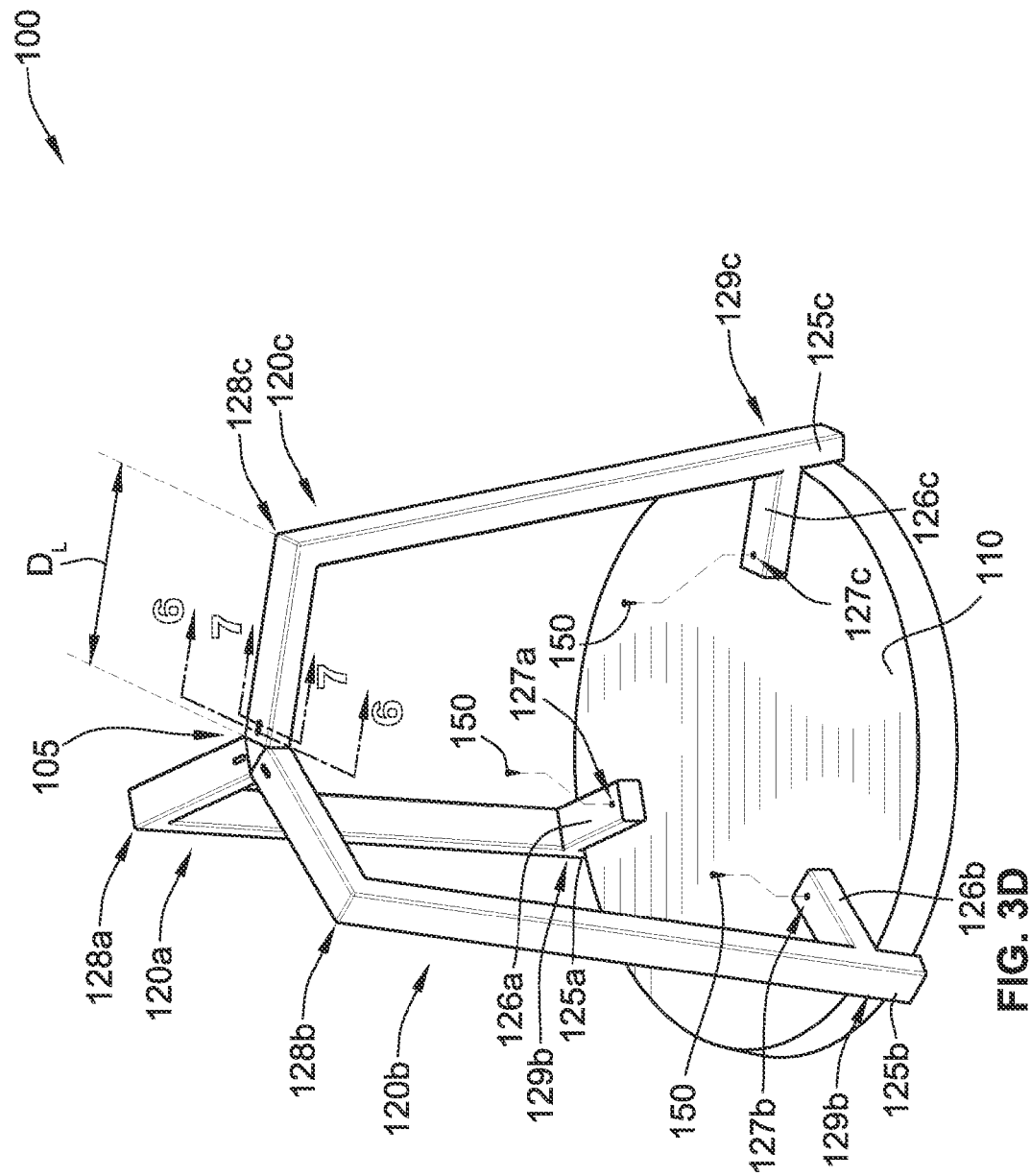

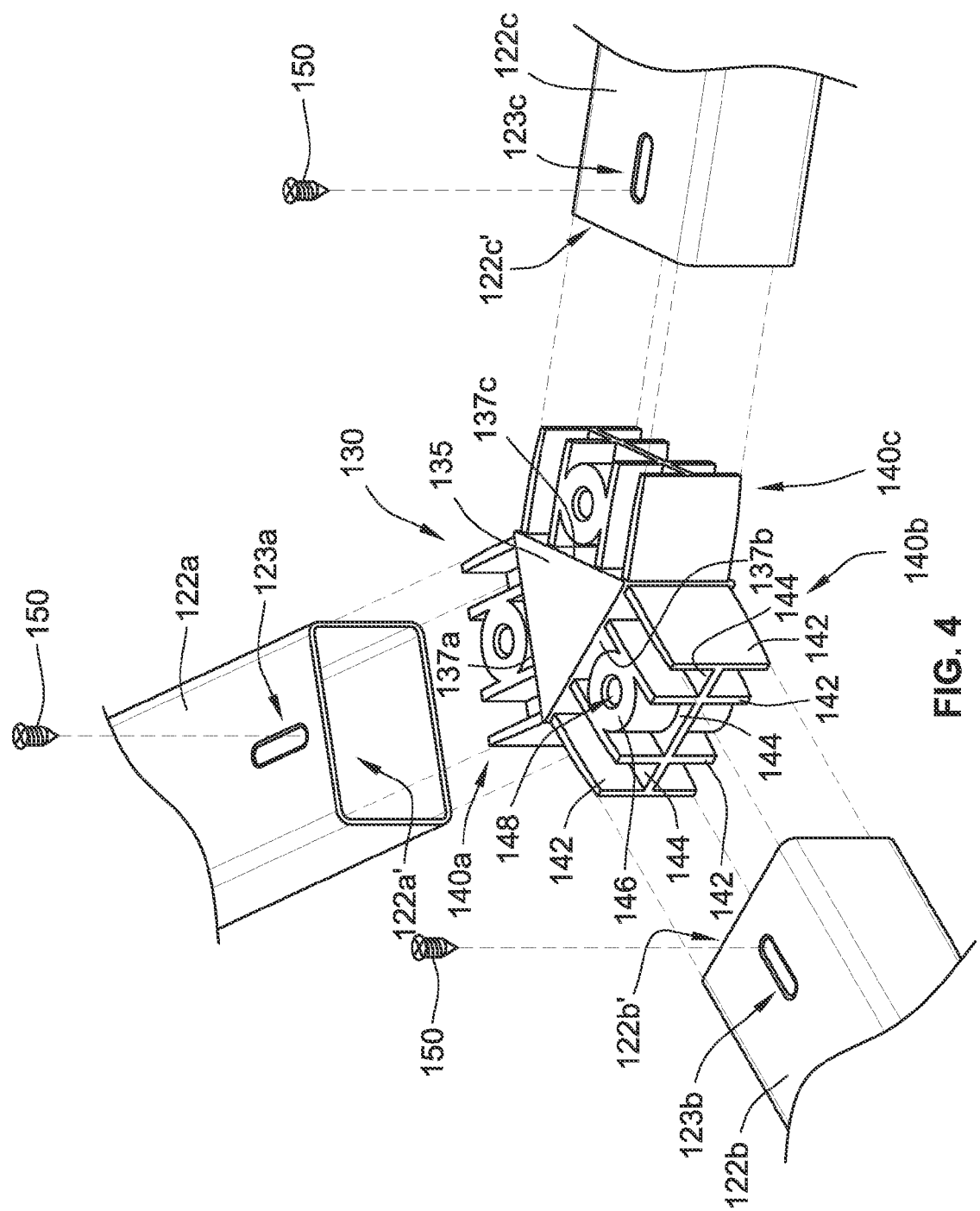

CONNECTOR PIECE FOR CONNECTING MULTIPLE LEGS

CROSS-REFERENCE TO RELATED APPLICATIONS

This application claims the benefit of U.S. Provisional Application No. 61/933,399, filed Jan. 30, 2014, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to table assemblies and, more particularly, to a table assembly having a leg connector for coupling legs together.

BACKGROUND

Consumers often purchase tables in a preassembled configuration requiring special and usually expensive shipping arrangements to be made due to the large size and often awkward shape of the table. While some tables can be purchased and shipped to customers in a disassembled configuration, the assembly of such tables is often complex and can result in relatively unprofessionally assembled tables. For example, some of such prior tables when assembled by the consumer (as opposed to a furniture factory) can be wobbly and/or rickety, which can result in the table not standing properly in its final resting position. One cause of such wobbly and/or rickety tables can be the type and location of the connection of the legs to the table top. Another cause can be the orientation and connection of the legs to each other. The present disclosure is directed toward solving these and other problems.

SUMMARY OF THE INVENTION

According to some implementations of the present disclosure, a leg connector includes a core portion and a plurality of coupling portions. Each of the plurality of coupling portions extends from the core portion. Each coupling portion includes a plurality of generally vertical spaced apart fins, a plurality of generally horizontal fins, and a fastener receiving element. Each of the plurality of generally vertical spaced apart fins is coupled to the core portion and extends away therefrom. Each of an outer pair of the vertical fins is at least partially tapered in two dimensions such that a thickness and a height of each of the outer pair of vertical fins decrease along a length of the outer pair of vertical fins in a direction away from the core portion. Each of the plurality of generally horizontal fins is positioned between two of the vertical fins and coupled thereto. The fastener receiving element is positioned between an inner pair of the vertical fins and has a throughbore for receiving a fastener therein to aid in coupling one of a plurality of table legs to the leg connector.

The leg connector can be used in combination with a plurality of table legs and a table top for rigidly coupling the plurality of table legs together, thereby forming a leg subassembly. The leg subassembly can be coupled with the table top, thereby forming an assembled table.

According to some implementations of the present disclosure, a leg connector for securing legs that support a load includes a core and at least three coupling portions extending away from the core and arranged equidistantly around the core. Each coupling portion includes fins that bend inwardly when the coupling portion is inserted into an exposed end of a corresponding one of the legs. Each of the coupling portions includes a hole that receives a fastener to secure the respective coupling portion with a corresponding one of the legs.

Additional aspects of the present disclosure will be apparent to those of ordinary skill in the art in view of the detailed description of various implementations, which is made with reference to the drawings, a brief description of which is provided below.

BRIEF DESCRIPTION OF THE DRAWINGS

FIG. 3C is a perspective view of the leg connector coupled to all three of the three legs of the table assembly of FIG. 1, thereby forming a leg subassembly;

FIG. 3D is a perspective view of the leg subassembly of FIG. 3C being coupled to the table top of the table assembly of FIG. 1;

FIG. 4 is an enlarged partial perspective view of the leg connector relative to the three legs of the table assembly of FIG. 1;

Figure 1:
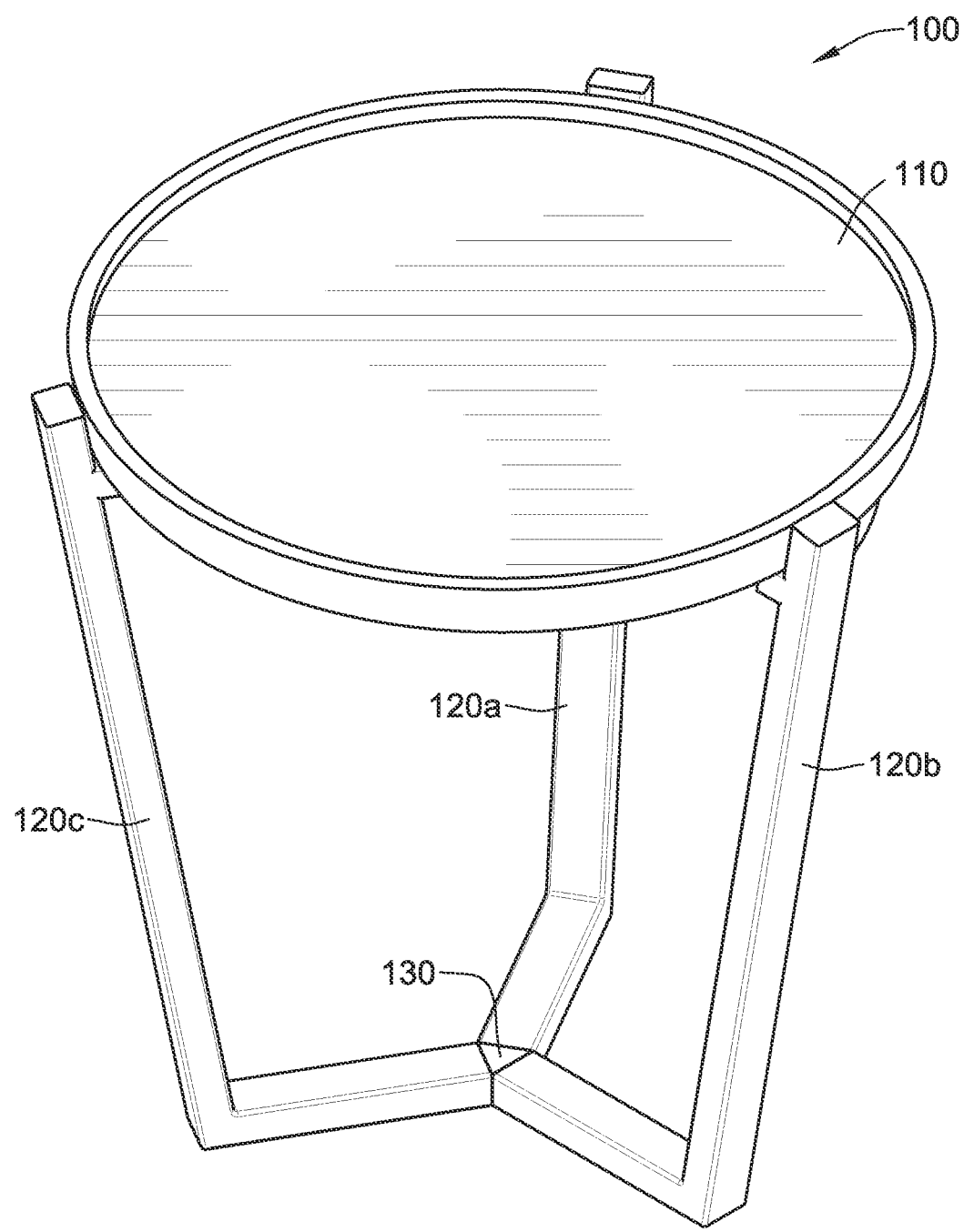
FIG. 1 is a perspective view of a table assembly according to some aspects of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is intended to cover all modifications, equivalents, and alternatives falling within the spirit and scope of the present disclosure as defined by the appended claims.

DETAILED DESCRIPTION

While this disclosure is susceptible of embodiment in many different forms, there is shown in the drawings and will herein be described in detail preferred implementations of the disclosure with the understanding that the present disclosure is to be considered as an exemplification of the principles of the disclosure and is not intended to limit the broad aspect of the disclosure to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, a table assembly 100 in its assembled position is shown. The table assembly 100 includes a load or table top 110, a multitude of table legs 120a, 120b, 120c, and a leg connector 130. The table top 110 can be made of any material such as, for example, wood, metal, plastic, glass, etc. or any combination thereof, but in the illustrated example is made of wood (e.g., solid oak, solid pine, solid walnut, veneered plywood, veneered pressed board, laminated plywood, etc.). Instead of a table top 110, the load can be any furniture item or art object, such as a shelf, a cabinet, a sculpture, a vase, a light fixture, a mirror, a fan assembly, a picture frame, etc. The table legs 120a, 120b, 120c, can be made of any material such as, for example, metal, plastic, etc. or any combination thereof, but are preferably made of a tubular metal (e.g., a rectangular-tubular aluminum material, a rectangular-tubular steel material, etc.). The leg connector 130 can be made of any material such as, for example, metal (e.g., aluminum, steel, etc.), plastic, etc. or any combination thereof, but in the illustrated example is made of metal (e.g., steel, aluminum, etc.). Further, the leg connector can be milled from a blank of material (e.g., an aluminum blank, a plastic blank, etc.), printed using a rapid prototyping machine, injected molded using an injection molding process, or a combination thereof (e.g., a portion is milled and a portion is injection molded and the two portions are sonic welded together). No matter which process is used to make the leg connector 130, the leg connector 130 can be made as a single monolithic part or multiple parts coupled together using any known methods (e.g., sonic welding, metal welding, glue, fasteners, etc.).

Figure 2:
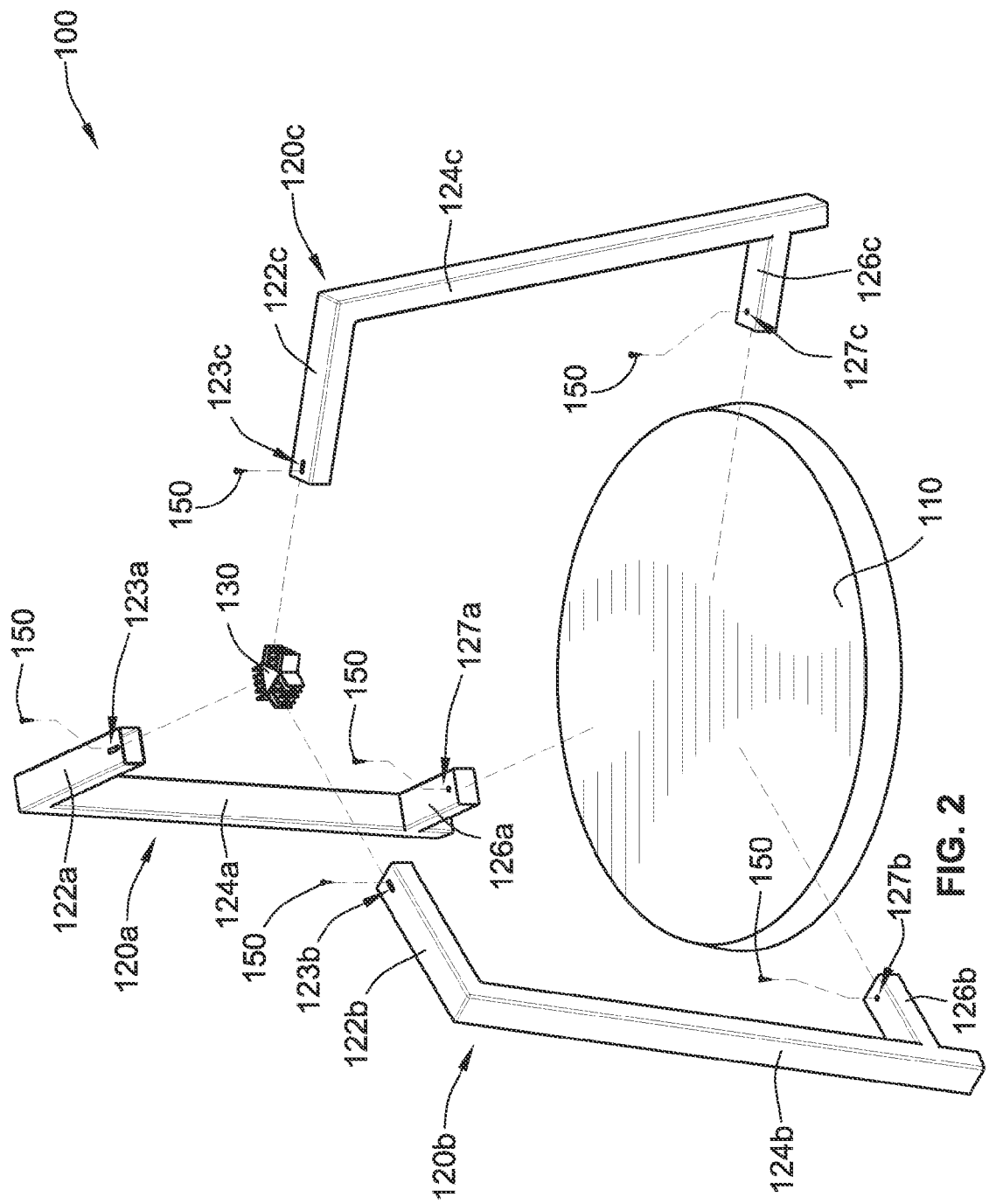
FIG. 2 is an exploded perspective view of the table assembly of FIG. 1.

The table assembly 100 is flipped upside down and shown exploded in FIG. 2 to illustrate the various components of the table assembly 100 and to illustrate how each component can be connected to form the table assembly 100 (FIG. 1). As best shown in FIG. 2, each of the legs 120a, 120b, 120c, includes a base beam 122a, 122b, 122c, respectively, an elongated angled column 124a, 124b, 124c, respectively, and a support beam 126a, 126b, 126c, respectively. That is the first leg 120a includes a base beam 122a, an elongated angled column 124a, and a support beam 126a. Similarly, the second leg 120b includes a base beam 122b, an elongated angled column 124b, and a support beam 126b, and the third leg includes a base beam 122c, an elongated angled column 124c, and a support beam 126c. In the illustrated example, each of the base beams 122a, 122b, 122c can transition seamlessly and directly to each corresponding elongated angled column 124a, 124b, 124c. Likewise, each of the elongated angled columns 124a, 124b, 124c can transition seamlessly and directly to each corresponding support beam 126a, 126b, 126c. Each support beam 126a, 126b, 126c points toward one another and is generally coplanar with one another. Similarly. Each base beam 122a, 122b, 122c points toward one another and is generally coplanar with one another. A load, such as a table top 110, rests or is secured on top of the support beams 126a, 126b, 126c as described below. In the illustrated example, because each elongated angled column 124a, 124b, 124c is bent at an acute angle (as shown) relative to a horizontal line extending away from the leg connector 130, the length of the base beams 122a, 122b, 122c is longer than the length of the support beams 126a, 126b, 126c, though the support beams 126a, 126b, 126c can be longer than the base beams 122a, 122b, 122c to support heavier loads (e.g., a bookcase or cabinet). It should be emphasized that each leg 120a, 120b, 120c including its respective base beam, elongated angled column, and support beam, can be a single, monolithic piece, or can be formed from multiple pieces and welded or otherwise joined together using conventional techniques.

The base beam 122a and the elongated angled column 124a of the first leg 120a come together at a first elbow 128a; and the support beam 126a and the elongated angled column 124a of the first leg 120a come together at a first intersection 129a (FIG. 3D). Similarly, the base beam 122b and the elongated angled column 124b of the second leg 120b come together at a second elbow 128b; and the support beam 126b and the elongated angled column 124b of the second leg 120b come together at a second intersection 129b (FIG. 3D); and the base beam 122c and the elongated angled column 124c of the third leg 120c come together at a third elbow 128c; and the support beam 126c and the elongated angled column 124c of the third leg 120c come together at a third intersection 129c (FIG. 3D).

When the table assembly 100 is in the assembled position (FIG. 1), the base beams 122a, 122b, 122c form the base (relative to earth) of the table assembly 100 that rests on the surface on which the table assembly 100 is positioned (e.g., a floor). However, one or more feet, casters, wheels, or the like (not shown) can be coupled to, for example, an underside of the base beams 122a, 122b, 122c to directly contact the floor to, for example, provide a non-slip surface.

Additionally, when the table assembly 100 is in the assembled position (FIG. 1), the support beams 126a, 126b, 126c together form a support for supporting/holding a load such as the table top 110. The elongated angled columns 124a, 124b, 124c, determine the overall height of the table assembly 100 in the assembled position (FIG. 1). The longer the elongated angled columns 124a, 124b, 124c, the taller the table assembly 100. Each of the elongated angled columns 124a, 124b, 124c is angled away from the other relative to vertical. By "angled" it is meant that in the assembled position (FIG. 1) with the table assembly 100 resting on a generally flat (i.e., horizontal) surface (e.g., a floor), the elongated angled columns 124a, 124b, 124c are at a non-zero angle with respect to vertical. For example, the elongated angled columns 124a, 124b, 124c can have an angle with respect to vertical of about three degrees, about five degrees, about ten degrees, about fifteen degrees, about twenty degrees, or any other angle, as measured from either end of the column 124a, 124b, 124c. In some implementations, the elongated angled columns 124a, 124b, 124c are generally vertical (e.g., at a zero angle with respect to vertical, which is not shown). Similarly, the base beams 122a, 122b, 122c and the support beams 126a, 126b, 126c are generally horizontal (e.g., at a zero angle with respect to horizontal). In some implementations, the base beams 122a, 122b, 122c have a non-zero angle with respect to horizontal (e.g., about one degree, about three degrees, about five degrees, etc., or any other angle with respect to horizontal, which is not shown).

Figure 3A:
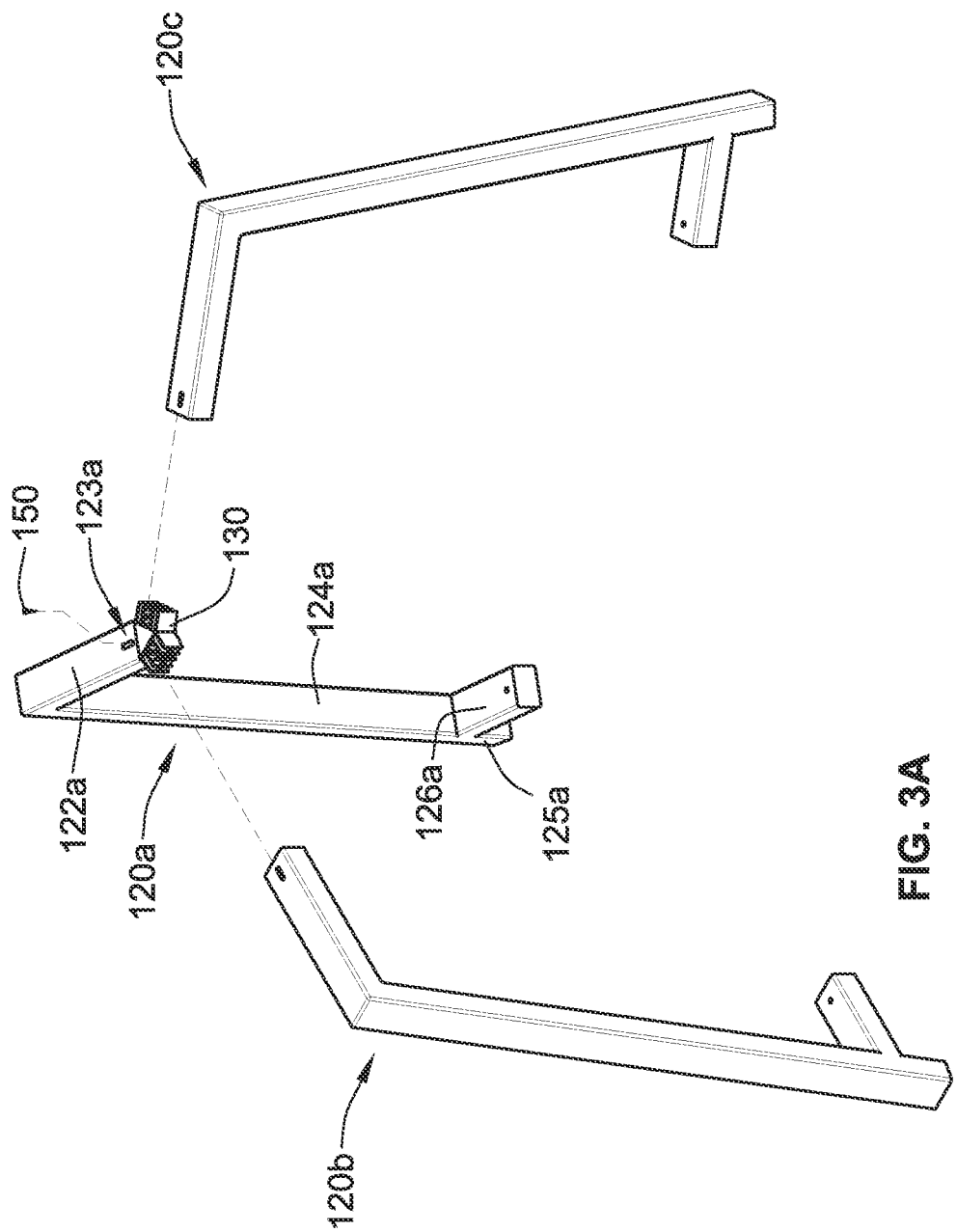
FIG. 3A is a perspective view of a leg connector coupled to one of the three legs of the table assembly of FIG. 1.

To assemble the table assembly 100 into the assembled position (FIG. 1) from the exploded position (FIG. 2), the installer can begin the assembly upside-down such as shown in FIG. 2, and then flip the final assembled furniture item to its operational upright position. To do so, each hollow end of the table legs 120a, 120b, 120c is inserted over the leg connector 130 to form a leg subassembly 105 (FIG. 3D), and then the leg subassembly 105 is coupled to the table top 110 as shown in FIG. 3D. Referring to FIG. 3A, to form the leg subassembly 105, the first leg 120a is coupled with the leg connector 130. To couple the first leg 120a with the leg connector 130, a first coupling portion 140a (FIG. 4) of the leg connector 130 is pressed into an open end 122a' (FIG. 4) of the base beam 122a of the first leg 120a (alternately, the open ends 122a', 122b', 122c' of each table leg 120a, 120b, 120c can be inserted over the corresponding coupling portion 140a, 140b, 140c—which piece moves relative to the other to couple them together is of no importance). In some implementations, the coupling portions 140a, 140b, 140c (FIG. 4) of the leg connector 130 can be press fit and/or interference fit with the open ends 122a', 122b', 122c' (FIG. 4) of the base beams 122a, 122b, 122c of the legs 120a, 120b, 120c.

To further secure the first coupling portion 140a with the first leg 120a, a fastener 150 (e.g., a screw, a bolt, or the like) is used. Specifically, the base beam 122a of the first leg 120a includes an elongated slot 123a to permit the fastener 150 to partially pass therethrough and engage a fastener receiving element 146 (FIGS. 4 and 5B) of the first coupling portion 140a of the leg connector 130 in a removable manner (e.g., in a threadingly manner). The elongated slots 123a, 123b, 123c permit some play to ensure a seamless fit between the legs 120a, 120b, 120c and corresponding coupling portions 140a, 140b, 140c of the leg connector 130, and to ensure that the base beams 122a, 122b, 122c lay as flat as possible (e.g., completely coplanar) in the final table assembly 100 (FIG. 1). The resulting table assembly 100 exhibits a very rigid and stable comportment as the base beams 122a, 122b, 122c lie flat on the ground surface on which the table assembly 100 rests, and the table legs 120a, 120b, 120c exhibit no or very little wobbling when secured to the leg connector 130, and the entire table assembly 100 can support heavy loading without tipping over or buckling.

Figure 3B:
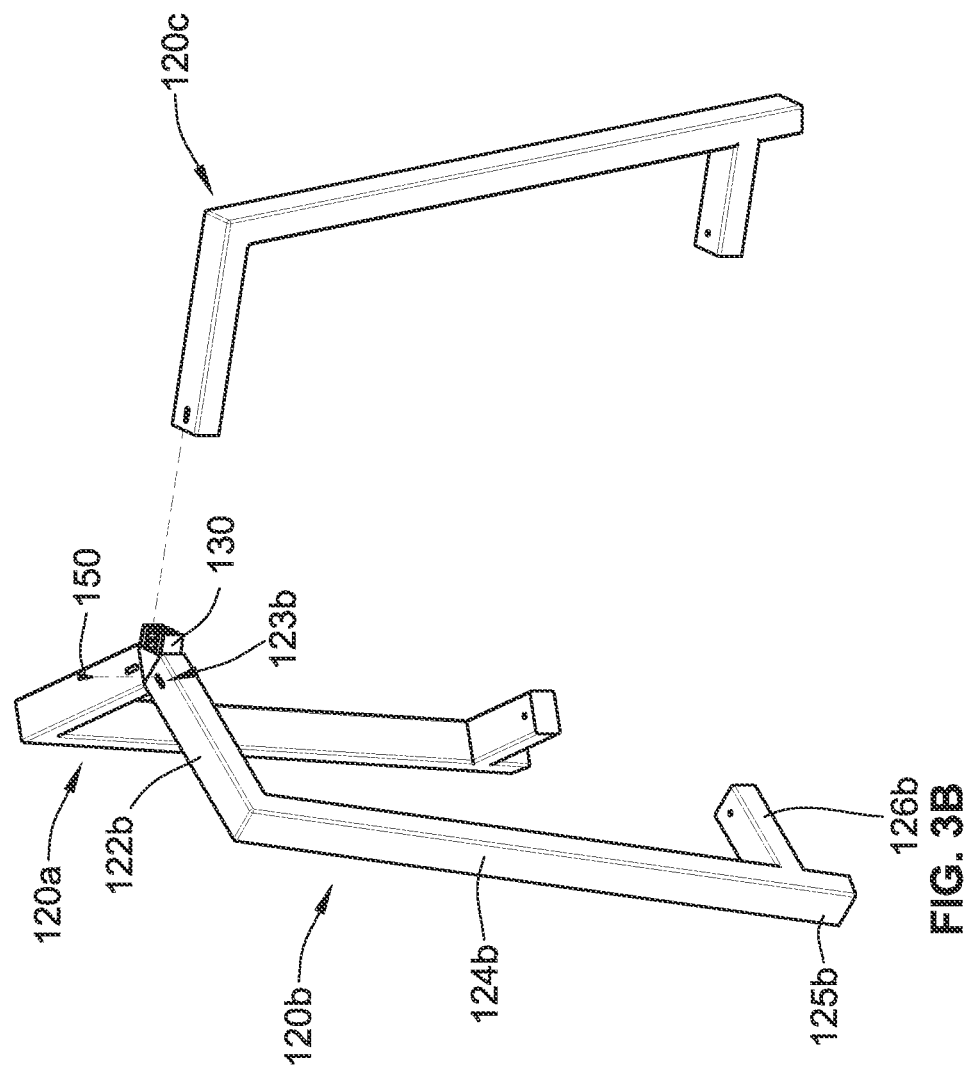
FIG. 3B is a perspective view of the leg connector coupled to two of the three legs of the table assembly of FIG. 1.

Once the first leg 120a is secured to the leg connector, the second leg 120b is coupled with the leg connector 130 in the same manner as the first leg 120a. Specifically, referring to FIG. 3B, to couple the second leg 120b with the leg connector 130, a second coupling portion 140b (FIG. 4) of the leg connector 130 is pressed into an open end 122b' (FIG. 4) of the base beam 122b of the second leg 120b. To further secure the second coupling portion 140b with the second leg 120b, a fastener 150 (e.g., a screw, a bolt, or the like) is used. Specifically, the base beam 122b of the second leg 120b includes an elongated slot 123b to permit the fastener 150 to partially pass therethrough and engage a fastener receiving element 146 (FIGS. 4 and 5B) of the second coupling portion 140b of the leg connector 130 in a removable manner (e.g., in a threadingly manner).

Once the second leg 120b is secured to the leg connector, the third leg 120c is coupled with the leg connector 130 in the same manner as the first leg 120a and the second leg 120b. Specifically, referring to FIG. 3C, to couple the third leg 120c with the leg connector 130, a third coupling portion 140c (FIG. 4) of the leg connector 130 is pressed into an open end 122c' (FIG. 4) of the base beam 122c of the third leg 120c. To further secure the third coupling portion 140c with the third leg 120c, a fastener 150 (e.g., a screw, a bolt, or the like) is used. Specifically, the base beam 122c of the third leg 120c includes an elongated slot 123c to permit the fastener 150 to partially pass therethrough and engage a fastener receiving element 146 (FIGS. 4 and 5B) of the third coupling portion 140c of the leg connector 130 in a removable manner (e.g., in a threadingly manner).

As best shown in the cross-sectional view of FIG. 6, each of the elongated slots 123a, 123b, 123c has a tapered perimeter edge that mates with the head of the fasteners 150 such that the heads of the fasteners 150 are countersunk into the base beams 122a, 122b, 122c (the heads of the fasteners 150 are at best flush or lie slightly below the outer plane of the corresponding base beam 122a, 122b, 122c). As such, the table assembly 100 can be slid along a surface (e.g., floor) in its upright position (FIG. 1) and the heads of the fasteners 150 will not protrude therefrom scratching the surface (e.g., scratching the floor).

Referring to FIG. 3D, with all of the legs 120a, 120b, 120c coupled to the leg connector 130, thereby forming the leg subassembly 105, the leg subassembly 105 is ready to be coupled with the table top 110. As shown in FIG. 3D, each of the support beams 126a, 126b, 126c, includes an optional aperture 127a, 127b, 127c, respectively, for receiving an optional fastener 150 (e.g., a screw, a bolt, or the like) therethrough. The fasteners 150 at least partially pass through the respective apertures 127a, 127b, 127c to engage an underside of the table top 110 in a removable manner (e.g., a threadingly manner). In some implementations, the table top 110 is pre-drilled with corresponding apertures (not shown) to receive the fasteners 150 therein. The predrilled apertures (not shown) of the table top 110 can be pre-tapped with threads or general straight walled bores (e.g., untapped). In alternate implementations, the load, such as the table top 110, can rest by gravity alone on top of the support beams 126a, 126b, 126c without any fasteners securing the table top 110 to the support beams 126a, 126b, 126c.

As best shown in FIGS. 3A-3D, the elongated angled columns 124a, 124b, 124c of the table assembly 100 extend past the support beams 126a, 126b, 126c, at the intersections 129a, 129b, 129c, thereby forming edge supports 125a, 125b, 125c, which provide lateral support to the table top 110 in the assembled position (FIG. 1). While the table top 110 is described as being secured to the leg subassembly 105 with fasteners 150, in some implementations, the table top 110 is not secured to the leg subassembly 105 using fasteners 150, but rather the table top 110 rests on the support beams 126a, 126b, 126c between the edge supports 125a, 125b, 125c.

As mentioned above, the resulting table assembly 100 (FIG. 1) has an overall stable and rigid configuration with a low risk of tipping over or wobbling, which is aided in part by the proportions of the length of the base beams 122a, 122b, 122c relative to the length of the portion of the elongated angled columns 124a, 124b, 124c between the base beam 122a, 122b, 122c and the support beam 126a, 126b, 126c. For example, the ratio of the length of the base beams 122a, 122b, 122c compared to the length of the portion of the elongated angled columns 124a, 124b, 124c between the base beam 122a, 122b, 122c and the corresponding support beam 126a, 126b, 126c can be between 1:1.5 and 1:3, or 1:2 and 1:3, or between 1:3 and 1:4, or between 1:4 and 1:5

Further, as shown in FIG. 3D, the elbows 128a, 128b, 128c of each table leg 120a, 120b, 120c are spaced from a core portion 135 (FIG. 4) of the leg connector 130 a distance, $D_L$, substantially equal to a length of the base beams 122a, 122b, 122c of each table leg 120a, 120b, 120c. As such, the load of the table top 110 and any items thereon, is transferred away from the center of the table top 110 and to the elongated angled columns 124a, 124b, 124c that generally extend from and along the outer perimeter edges of the table top 110. Such loads are transferred to the leg connector 130 through the base beams 122a, 122b, 122c, which is at least partially absorbed by the leg connector 130. Because the elongated angled columns 124a, 124b, 124c are slightly angled away from each other (e.g., ten to fifteen degrees relative to vertical), any load pressing down on the support beams 126a, 126b, 126c will tend to cause a moment about each of the coupling portions 140a, 140b, 140c, along with a concomitant tendency for the base beams 122a, 122b, 122c to rotate toward one another away from the load. The leg connector 130 successfully resists these twisting forces to provide a stable configuration.

Figure 5A:
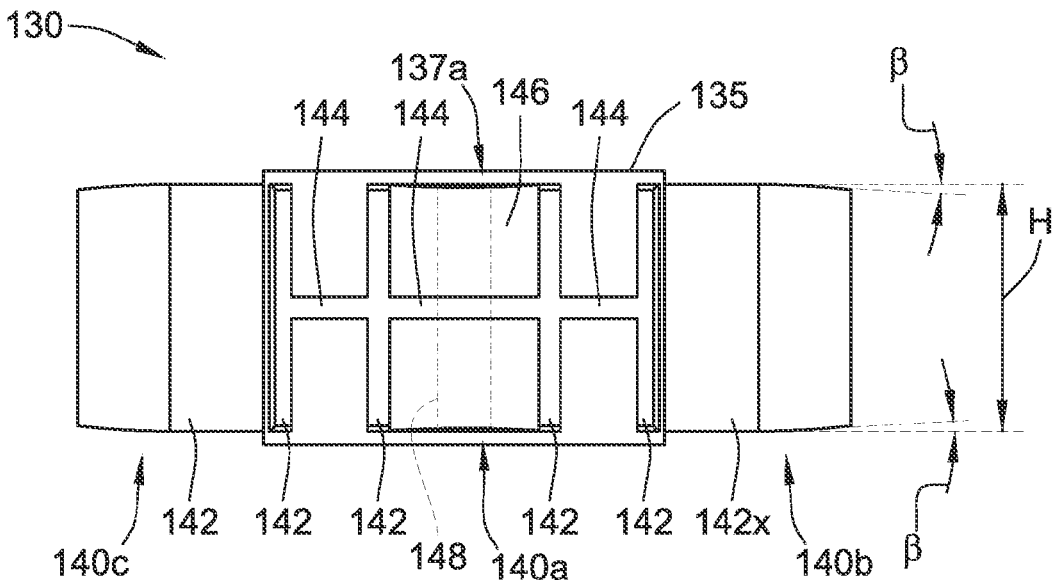
FIG. 5A is an enlarged side view of the leg connector of the table assembly of FIG. 1.
Figure 5B:
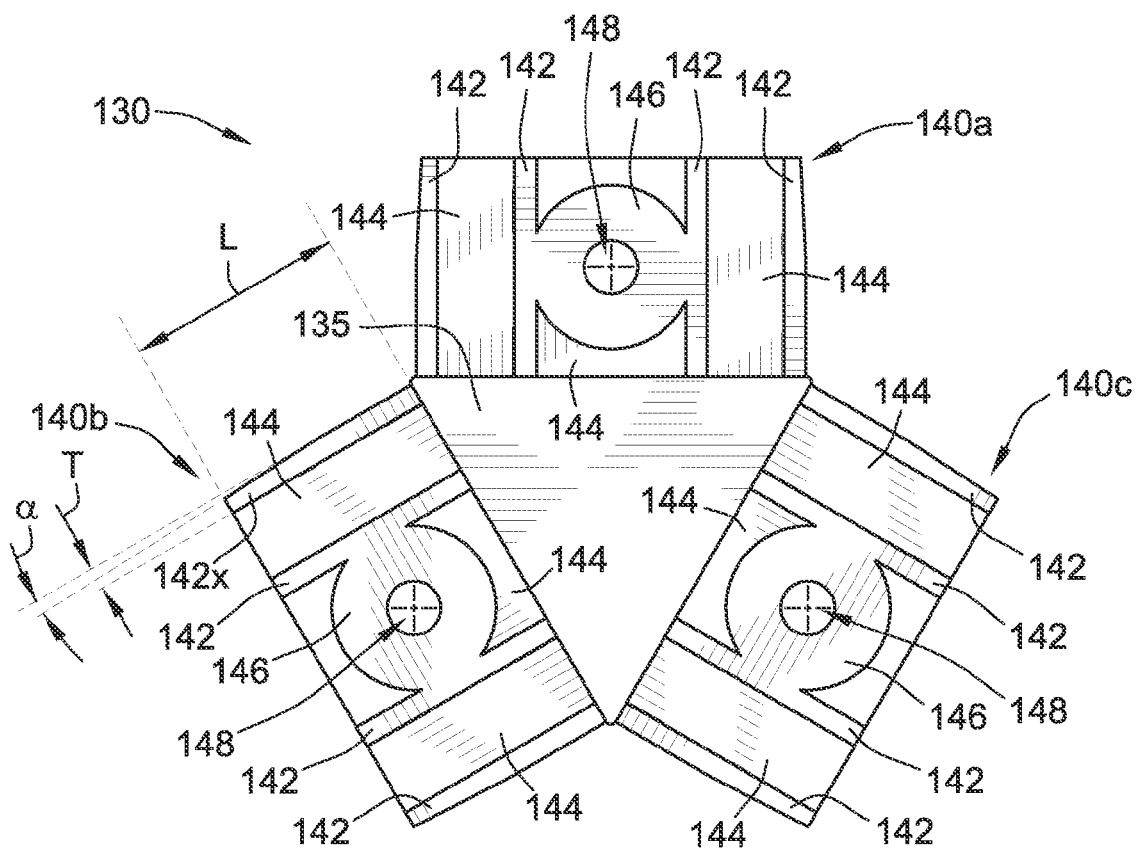
FIG. 5B is an enlarged top view of the leg connector of the table assembly of FIG. 1.

Referring generally to FIGS. 4, 5A, and 5B, the leg connector 130 details are discussed. The leg connector 130 includes a core portion 135 and at least three coupling portions 140a, 140b, 140c (e.g., a fourth coupling portion (not shown) can be added to a square-shaped or a rectangular-shaped core portion). The core portion 135 has an equilateral-triangular shaped horizontal cross-section, although various other cross-sections are contemplated (e.g., square, rectangular, etc.). Each of the coupling portions 140a, 140b, 140c extends from the core portion. The coupling portions 140a, 140b, 140c are integral with the core portion 135 such that the coupling portions 140a, 140b, 140c and the core portion 135 are a single monolithic component. Alternatively, the coupling portions 140a, 140b, 140c are separate components than the core portion 135 that are securely coupled to the core portion 135 (e.g., sonic welded, etc.).

Each of the coupling portions 140a, 140b, 140c includes a multitude of generally vertical and spaced-apart fins 142 (vertical fins 142), a multitude of generally horizontal fins 144 (horizontal fins 144), and a fastener receiving element 146. Each of the vertical fins 142 is coupled to the core portion 135 and extends away therefrom. The vertical fins 142 include an outer pair of vertical fins 142 and an inner pair of vertical fins 142. As best shown in FIGS. 5A and 5B, each of the outer pair of the vertical fins 142 is at least partially tapered in two dimensions such that a thickness, T, and a height, H, of each of the outer pair of vertical fins 142 decrease along a length, L, of the outer pair of vertical fins 142 in a direction away from the core portion 135. Specifically, the thickness, T, of vertical fin 142x decreases for a portion of the vertical fin 142x along the length, L, which is illustrated by angle α in FIG. 5B. Further, the height, H, of vertical fin 142x decreases for a portion of the vertical fin 142x along the length, L, which is illustrated by angle β in FIG. 5A. The fins provide a good compromise between using as little overall material as possible for the leg connector 130 while supplying the rigidity and robustness needed for a component that interfaces with at least three legs 120a, 120b, 120c.

As shown in FIGS. 5A and 5B, each vertical fin 142 that is one of the outer pairs of vertical fins 142 has such a dual tapering in two dimensions as described in reference to the vertical fin 142x. The dual tapering of the outer pair of vertical fins 142 for each of the coupling portions 140a, 140b, 140c aids in the coupling of the leg connector 130 with the multitude of table legs 120a, 120b, 120c. In order to provide the assistance of the dual tapering during the installation, while also maintaining a robust and secure connection between the coupling portions 140a, 140b, 140c, and the base beams 122a, 122b, 122c, the dual tapering occurs along only a portion of the length of the outer pair of vertical fins 142. The impact of the varying cross-sections of the outer pair of vertical fins 142 on the connection can be seen by comparing the cross-sectional views of FIGS. 6 and 7, taken along lines in FIG. 3D. Generally, the cross-section of the outer pair of vertical fins 142 near the core portion 135 is larger (e.g., thicker and taller) than the cross-section of the outer pair of vertical fins 142 near its tip (i.e., away from the core portion 135). Specifically, as shown in FIG. 6, the cross-section of the outer pair of vertical fins 142 near the core portions 135 interferes with the inner wall of the base beam 122a, whereas, as shown in FIG. 7, the cross-section of the outer pair of vertical fins 142 away from the core portions 135 does not interfere with the inner wall of the base beam 122a. While the cross-sections of FIGS. 6 and 7 are shown as being taken through the third leg 120c, the same cross-sections for the first and the second legs 120a and 120b are identical.

Figure 6:
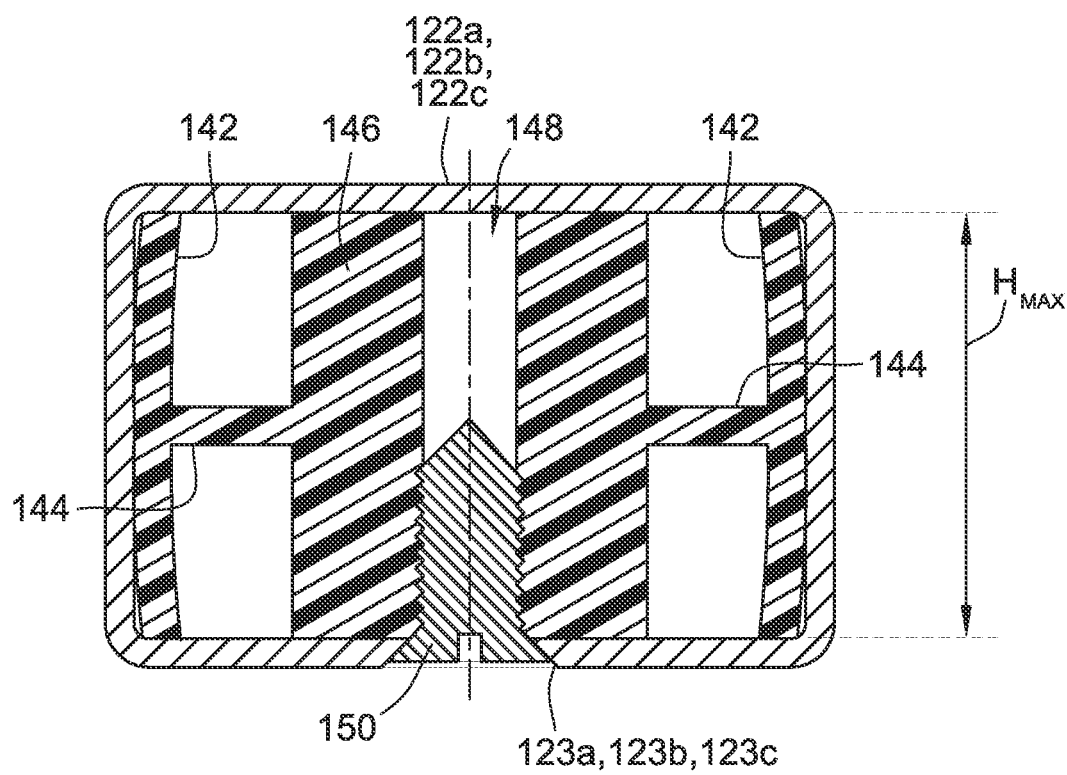
FIG. 6 is an enlarged cross-sectional view of the leg subassembly of FIG. 3C taken through a fastener coupling the leg connector to one of the legs of the leg subassembly.
Figure 7:
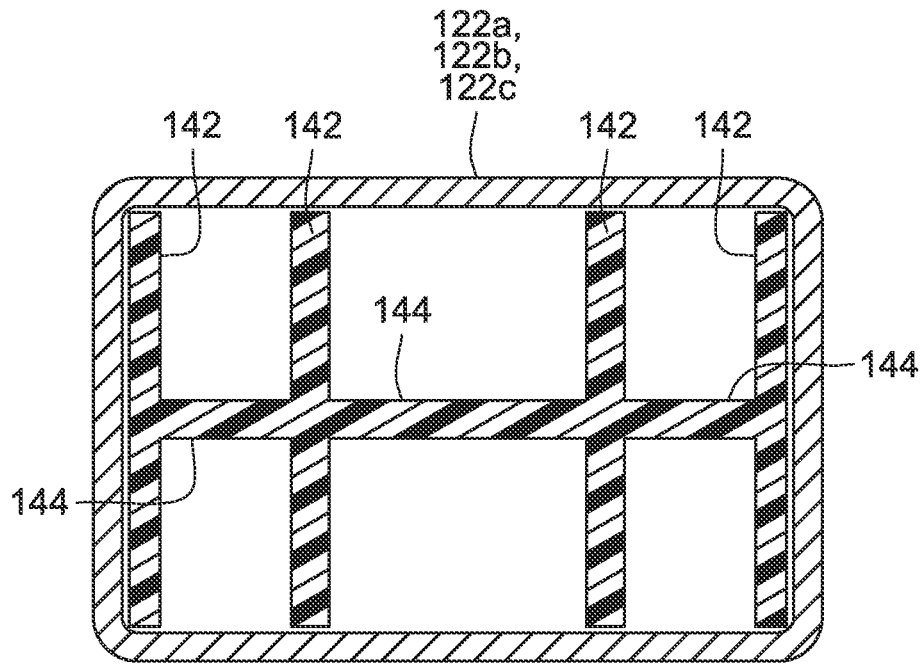
FIG. 7 is an enlarged cross-sectional view of the leg subassembly of FIG. 3C taken distally of the fastener coupling the leg connector to the one of the legs of the leg subassembly.

Further, as best shown in FIG. 6, a maximum height of each of the outer pair of vertical fins 142 is slightly greater than a maximum inner height, $H_{max}$, of each of the table legs 120a, 120b, 120c. As such, when the coupling portions 140a, 140b, 140c are inserted into the open ends 122a', 122b', 122c' of the table legs 120a, 120b, 120c, the outer pair of vertical fins 142 of each of the coupling portions 140a, 140b, 140c interferes with the inner wall of the base beams 122a, 122b, 122c causing the outer pair of vertical fins 142 of each of the coupling portions 140a, 140b, 140c to bend (e.g., bend inward), compress in height, and/or otherwise deform. The bending/compressing/deforming of the outer pair of vertical fins 142 of each of the coupling portions 140a, 140b, 140c is referred to as an interference fit. The interference fit of the outer pair of vertical fins 142 with the open ends 122a', 122b', 122c' of the table legs 120a, 120b, 120c provides a rigid and stable/secure connection therebetween. By "slightly greater" it is meant that the difference in height is about 0.01 inches, about 0.02 inches, about 0.05 inches, about 0.1 inches, or some other small difference such that the coupling portions 140a, 140b, 140c can fit into the open ends 122a', 122b', 122c' of the table legs 120a, 120b, 120c without failing (e.g., breaking). Further, the interference fit is shown as only being along a portion of the length, L, of the outer pairs of vertical fins 142, as described in reference to FIG. 7—the front dual tapered portions of the coupling portions 140a, 140b, 140c, readily fit into the open ends 122a', 122b', 122c' for ease of installation. Advantageously, the interference fit and fin design allow for significant variance in the inner dimensions of the open ends 122a', 122b', 122c' of the base beams 122a, 122b, 122c, due to, for example, manufacturing tolerances, etc. The vertical fins 142 accommodate this dimensional variance in the tubing of the legs 120a, 120b, 120c to ensure a snug fit due to the ability of the vertical fins 142 to "bend inwardly," compress in height, and/or otherwise deform. Thus, the same leg connector 130 can be manufactured without changing the dimensions of the leg connector 130 to accommodate a variety of leg tubing diameters and manufacturing tolerances.

Referring back to FIGS. 4, 5A, and 5B, the horizontal fins 144 are positioned between two adjacent vertical fins 142. Specifically, for each of the coupling portions 140a, 140b, 140c, a first one of the horizontal fins 144 is positioned between and coupled to and/or integral with one of the outer pair of vertical fins 142 and one of the inner pair of vertical fins 142. Similarly, a second one of the horizontal fins 144 is positioned between and coupled to and/or integral with the other of the outer pair of vertical fins 142 and the other of the inner pair of vertical fins 142. A third middle one of the horizontal fins 144 is positioned between and coupled to and/or integral with both of the inner pair of vertical fins 142. Further, the third middle one of the horizontal fins 144 includes an aperture (not shown) such that the fastener receiving element 146 passes therethrough.

Each of the inner pair of vertical fins 142 has a generally constant thickness and a generally constant height along a direction away from the core portion 135 of the leg connector 130 as opposed to the outer pair of vertical fins 142. The inner pair of vertical fins 142 is coupled to and/or integral with the fastener receiving element 146. The fastener receiving element 146 includes a throughbore 148 for receiving the fasteners 150 therein. As described above, the throughbore 148 can be a threaded throughbore or an unthreaded throughbore. The throughbore 148 has a central axis that is generally parallel with the vertical fins 142 and that is generally perpendicular with the horizontal fins 144. As shown the horizontal fins 144 are generally coplanar; however, the horizontal fins 144 can be staggered at various heights (not shown).

In some implementations, one or more of the horizontal fins 144 is designed to buckle (not shown) when the coupling portions 140a, 140b, 140c are inserted into the open ends 122a', 122b', 122c' of the table legs 120a, 120b, 120c. The buckling of the horizontal fins 144 can aid in providing a rigid and stable/secure connection between the coupling portions 140a, 140b, 140c and the table legs 120a, 120b, 120c.

While the leg connector 130 of the present disclosure is shown as include four vertical fins and three horizontal fins, any number of vertical and horizontal fins can be included for each coupling portion 140a, 140b, 140c, such as, for example, two vertical fins with one horizontal fin; six vertical fins with five horizontal fins, etc.

Each of the above implementations and obvious variations thereof is contemplated as falling within the spirit and scope of the claimed invention, which is set forth in the following claims.

What is claimed is:

1. A leg connector for rigidly coupling a plurality of table legs together, thereby forming a leg subassembly for coupling with a table top, thereby forming a table assembly, the leg connector comprising:
   a core portion; and
   a plurality of coupling portions extending from the core portion, each of the plurality of coupling portions including:
      a plurality of generally vertical spaced apart fins, each of the vertical fins being coupled to the core portion and extending away therefrom, each of an outer pair of the vertical fins at least partially tapers in a direction away from the core portion such that a thickness and a height of each of the outer pair of vertical fins decrease along a length of the outer pair of vertical fins;
      a plurality of generally horizontal fins, each of the horizontal fins being positioned between two of the vertical fins and coupled thereto; and
      a fastener receiving element positioned between an inner pair of the vertical fins and having a throughbore for receiving a fastener therein to aid in coupling one of the plurality of table legs to the leg connector.

2. The leg connector of claim 1, wherein a maximum height of each of the outer pair of vertical fins is greater than a maximum inner height of each of the table legs such that when the coupling portions are inserted into the table legs, the outer pair of vertical fins of each of the coupling portions bends.

3. The leg connector of claim 1, wherein the at least partial tapering in the direction away from the core portion of the outer pair of the vertical fins aids in the coupling of the leg connector with the plurality of table legs.

4. The leg connector of claim 1, wherein at least portion of each of the plurality of coupling portions is sized and shaped to be press fit into corresponding ones of the plurality of table legs to create a rigid and secure connection therebetween.

5. The leg connector of claim 1, wherein the fastener receiving element passes through one of the horizontal fins.

6. The leg connector of claim 1 in combination with the plurality of table legs and the table top, wherein each table leg includes a base beam and an elongated angled column that join together at an elbow such that the elongated angled column is at an angle with respect to vertical, the elbow of each table leg being spaced from the core portion a distance substantially equal to a length of the base beam of each table leg.

7. The combination of claim 6, wherein the elongated angled columns of each of the table legs extends away from the table top adjacent to a perimeter edge of the table top.

8. A leg connector for securing legs that support a load, comprising:
   a core;
   at least three coupling portions extending away from the core and arranged equidistantly around the core, each coupling portion including fins that bend inwardly when the coupling portion is inserted into an exposed end of a corresponding one of the legs, each of an outer pair of the fins at least partially tapers along a direction away from the core such that a thickness and a height of each of the outer pair of fins tapers to a smaller thickness and a smaller height, and each of the coupling portions including a hole that receives a fastener to secure the respective coupling portion with a corresponding one of the legs.

9. The leg connector of claim 8, wherein the fins bend inwardly when the coupling portion is inserted into an exposed end of the corresponding one of the legs due to a maximum height of each of the fins being greater than a maximum inner height of each of the legs.

10. The leg connector of claim 8, wherein the fins further comprise an inner pair of fins positioned between the outer pair of fins, each of the inner pair of fins having a generally constant thickness and a generally constant height along a direction away from the core.

11. The leg connector of claim 8 in combination with at least three legs and a load, wherein each leg includes a base beam and an elongated angled column that join together at an elbow such that the elongated angled column is at an angle with respect to vertical, the elbow of each leg being spaced from the core a distance substantially equal to a length of the base beam of each leg.

12. The combination of claim 11, wherein the elongated angled columns of each of the legs extends away from the load adjacent to a perimeter edge of the load.

13. The combination of claim 12, wherein the load is a table top.

14. The leg connector of claim 8, wherein the leg connector is made of aluminum, steel, any metal, any plastic, or a combination thereof.

15. The leg connector of claim 8, wherein the leg connector is milled from an aluminum blank or from a plastic blank.

16. The leg connector of claim 8, wherein the leg connector is made using an injection molding process.

\* \* \* \* \*